US006560923B1

(12) United States Patent
Kamei et al.

(10) Patent No.: US 6,560,923 B1
(45) Date of Patent: May 13, 2003

(54) AQUEOUS ARTIFICIAL MEDIA

(75) Inventors: Masatoshi Kamei, Wakayama (JP); Tadayuki Suzuki, Wakayama (JP); Masaharu Hayashi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/744,332

(22) PCT Filed: Jul. 23, 1999

(86) PCT No.: PCT/JP99/03967

§ 371 (c)(1), (2), (4) Date: Mar. 27, 2001

(87) PCT Pub. No.: WO00/04757

PCT Pub. Date: Feb. 3, 2000

(30) Foreign Application Priority Data

Jul. 23, 1998 (JP) .......... 10-208042

(51) Int. Cl.⁷ ............... A01G 31/00
(52) U.S. Cl. ............... 47/64
(58) Field of Search ............... 47/64

(56) References Cited

U.S. PATENT DOCUMENTS

| 3,798,836 A | | 3/1974 | Rubens et al. | |
|---|---|---|---|---|
| 4,194,998 A | * | 3/1980 | Fanta et al. | 106/206.1 |
| 4,559,074 A | * | 12/1985 | Clarke | 525/296 |
| 4,977,192 A | | 12/1990 | Martineu et al. | |
| 5,927,003 A | * | 7/1999 | Miller et al. | 47/1.01 R |
| 5,934,839 A | * | 8/1999 | Mallon et al. | 106/900 |
| 6,041,546 A | * | 3/2000 | Baranova | 47/64 |

FOREIGN PATENT DOCUMENTS

| GB | 1 376 091 | | 12/1974 | | |
|---|---|---|---|---|---|
| JP | 62095308 A | * | 5/1987 | ......... | C08F/220/06 |
| JP | 1101325 | | 7/1989 | | |
| JP | U1101325 | | 7/1989 | | |
| JP | 213306 | * | 1/1990 | ......... | A01G/1/00 |
| JP | A2013306 | | 1/1990 | | |
| JP | 2211808 | * | 1/1990 | ......... | A01G/1/00 |
| JP | A2211808 | | 8/1990 | | |
| JP | A8256592 | | 8/1996 | | |
| JP | A8266147 | | 10/1996 | | |
| JP | 09191870 A | * | 7/1997 | ......... | C12N/1/00 |
| WO | WO 92/19095 | | 11/1992 | | |

* cited by examiner

Primary Examiner—Charles T. Jordan
Assistant Examiner—Francis T. Palo
(74) Attorney, Agent, or Firm—Birch, Stewart, Kolasch & Birch, LLP

(57) ABSTRACT

The present invention provides an aqueous artificial medium comprising a water-absorbing polymer, which is suitable as a medium for cultivation in soil or hydroponic cultivation of plants. That is, the present invention provides an aqueous artificial medium and a polymer composition, comprising 0.01 to 10% by weight of a water-absorbing polymer and 0.001 to 10% by weight of a cationic polymer which is insoluble in water or an aqueous salt solution. Further, the present invention provides an aqueous artificial medium and a polymer composition, further comprising a porous water-supplying support having a communicating hole.

19 Claims, No Drawings

AQUEOUS ARTIFICIAL MEDIA

This application is the national phase under 35 U.S.C. §371 of PCT International Application No. PCT/JP99/03967 which has an International filing date of Jul. 23, 1999, which designated the United States of America.

TECHNICAL FIELD

The present invention relates to an aqueous artificial medium being preferably suitable as a substitute medium for soil, which is used for a plant (or vegetable) such as a potted plant and a cut flower.

BACKGROUND ART

It is already known that a water-absorbing polymer is used in a medium for a plant. For example, a polymer based on a crosslinked polyacrylate, a starch/polyacrylate or the like is mixed with a part of soil and used as the medium. If this is used as the medium being suitable for cultivation of a plant, it is particularly necessary that water-holding property and water-supplying property provided by the water-absorbing polymer is well-balanced or the like. From such a viewpoint, a water-absorbing polymer having an improved performance has been recently proposed.

For example, JP-A 8-256592 teaches an artificial medium blended with 0.3 to 10% by weight of a crosslinked homopolymer or copolymer based on N-vinyl carboxylic acid amide. The polymer has a well-balanced ability to hold water and to supply water to a plant and are considered to have no influence on growth of the plant, too. Further, JP-A 8-266147 discloses that, by incorporation of about 0.1 to 10% by weight of a crosslinked polymer such as a poly N-substituted (meth)acrylamide-derivative showing temperature-dependent equilibrium water adsorption ratio into a medium, the amount of supplied water is regulated depending on a change in the temperature.

When the water-absorbing polymer, particularly a polyacrylic acid-based anionic water-absorbing polymer, is used in the artificial medium, the polyacrylic acid remaining generally as a soluble component exerts an adverse effect on the plant, thus often causing insufficient growth. Further, it is known that the growth of the cut flower is inhibited by a waste matter derived from the plant, by colloidal particles in tap water, or by microbial germinal, bacterial, etc.) growth. To solve such a problem, the artificial media composed exclusively of the water-absorbing polymer(s) is unsatisfactory and hardly exhibits a cultivation ability equivalent to that of soil.

DISCLOSURE OF INVENTION

The present invention provides an aqueous artificial medium and a polymer composition comprising 0.01 to 10% by weight of a water-absorbing polymer and 0.001 to 10% by weight of a cationic polymer. The present invention provides the aqueous artificial medium and the polymer composition further comprising a porous water-supplying support having a communicating hole. When the balance is water, tap water is usually used, but purified water, deionized water or the like can also be used.

Preferably, the water-absorbing polymer is selected from an anionic polymer, a nonionic polymer and a mixture thereof. It may contain a porous water-supplying support having a communicating hole. The ratio by weight of the water-absorbing polymer: the cationic polymer may be from 1:0.01 to 1:10. It may further comprise a fertilizer.

The present invention provides a method of growing a plant in an aqueous artificial medium comprising 0.01 to 10% by weight of a water-absorbing polymer and 0.001 to 10% by weight of a cationic polymer, as well as use of a polymer composition comprising a water-absorbing polymer and a cationic polymer for an aqueous artificial medium.

Further, the present invention relates to a polymer composition for an aqueous artificial medium comprising a water-absorbing polymer and a cationic polymer at a ratio of from 1:0.01 to 1:10 by weight, as well as an aqueous artificial medium material comprising a polymer composition for an aqueous artificial medium comprising a water-absorbing polymer and a cationic polymer at a ratio of from 1:0.01 to 1:10 by weight and a porous water-supplying support having a communicating hole.

MODES FOR CARRYING OUT THE INVENTION

The water-absorbing polymer used in the present invention is a product rendered water-insoluble by slightly crosslinking (that is, making a three-dimension of) a water-soluble resin, and it is generally an anionic polymer or a nonionic polymer. However, this is not intended to exclude use of a cationic polymer such as a quaternary ammonium salt or of an ampho-ionic polymer. From the viewpoint of a wide use or the like, however, an anionic polymer, a nonionic polymer or a mixture thereof is preferable.

The anionic polymer includes e.g. a product based on polyacrylic acid, isobutylene/malate, starch/polyacrylate, vinyl alcohol/acrylate, carboxymethyl cellulose, acrylate/acrylamide or vinyl acetate/acrylate; a saponified product based on polyacrylonitrile or starch/acrylonitrile graft polymer; a product based on polysaccharide/acrylate, alginate or polysulfonate; and a saponified product based on vinyl acetate/acrylate copolymer. These can also be used singly or in combination thereof. These are generally powdery or fibrous and may be in a form of complex fiber with polyacrylonitrile core/polyacrylate shell.

The nonionic polymer includes those based on polyvinyl alcohol, starch/polyacrylonitrile, poloxyethylene, vinyl acetate/maleic anhydride, poly-N-vinyl acetamide and polyacrylamide. These can also be used singly or in combination thereof and are generally in a form of powdery or fibrous products.

Among the water-absorbing polymers described above, those based on polyacrylate, isobutylene/maleate, starch/polyacrylate, polyvinyl alcohol, vinyl acetate/maleic anhydride and poly N-acetamide are preferable. In view of water absorption, water-holding property, water penetration or the like, it is more preferable that the water-absorbing polymer based on polyacrylate, polyvinyl alcohol, vinyl acetate/maleic anhydride or poly N-acetamide is used.

The used amount of the water-absorbing polymer is in the range of from 0.01% by weight, which is the minimum amount of thereof being capable of holding water, to 10% by weight. If its amount is less than 0.01% by weight, the water-absorbing polymer is liquefied without being solidified. On the other hand, if its amount is more than 10% by weight, the water absorption is too strong, and water releasability is weak, to grow a plant. The used amount of the water-absorbing polymer is preferably 0.1 to 10% by weight.

The cationic polymer for use may be any cationic polymer of soluble or insoluble ones in an aqueous solution or an aqueous salt solution. The soluble one includes cationic cellulose, cationic starch, cationic chitosan, cationic polyvinyl alcohol and cationic guar gum. On the other hand, the insoluble one includes an acrylamide polymer modified with a group having a quaternary ammonium salt, an acrylamide/acrylate copolymer modified with a group having a quaternary ammonium salt, an acrylate polymer modified with a group having a quaternary ammonium salt (such as Amberlite IRA-458 provided by Japan Organo Co., Ltd.), a styrene polymer modified with a group having a quaternary ammonium salt, a styrene/divinyl benzene copolymer modified with a group having a quaternary ammonium salt (such as Diaion series provided by Mitsubishi Chemical Corp.; Amberlite series from Japan Organo Co., Ltd.; Dowex series from Dow Chemical Co.; and Duolite series from Chemical Process Co.), a diallylamine polymer modified with a group having a quaternary ammonium salt, and a condensate of alkylamine with epichlorohydrin modified with a group having a quaternary ammonium salt.

When an anion-exchange resin is used as the cationic polymer, its structure may be either in a gel form or in an MR (macro reticular structure). Its counter ion may be either OH type or Cl type. The ion-exchange capacity in total is preferably more than 2.0 mg equivalent/1 g dry resin. Further, a porous anion-exchange resin is preferable. The anion-exchange resin for use may be a commercial product being available under trade names such as Amberlite IRA-67 (provided by Japan Organo Co., Ltd., with its ion-exchange capacity in total of 5.6 mg equivalent/1 g dry resin), Dowex MSA-1 (provided by Dow Chemical Co., with its ion-exchange capacity in total of 4.2 mg equivalent/1 g dry resin,), Duolite A-101D (provided by Chemical Process Co., with its ion-exchange capacity in total of 4.1 mg equivalent/1 g dry resin), Amberlite IRA-904 and Amberlite XT5007 (of which both are provided by Japan Organo Co., Ltd. and porous), and Diaion (provided by Mitsubishi Chemical Industries Ltd. and being porous).

The used amount of the cationic polymer is 0.001 to 10% by weight. If it is less than 0.001% by weight, the toxicity of the water-absorbing polymer cannot be removed so that the effect of the added polymer cannot be obtained. On the other hand, if it is more than 10% by weight, the growth of the plant may be adversely affected. From the viewpoint of sufficiently demonstrating the added effect of the polymer and improving the growth of the plant, the used amount of the cationic polymer is preferably 0.01 to 7% by weight and more preferably 0.1 to 5% by weight.

The water-absorbing polymer and the cationic polymer are added such that the ratio by weight of the water-absorbing polymer:the cationic polymer is in the range of preferably from 1:0.01 to 1:10. It is more preferably from 1:0.1 to 1:5 and most preferably from 1:0.1 to 1:2. When it is in this range, the added effect of the cationic polymer is sufficiently demonstrated and the growth of the plant is remarkably improved.

The aqueous artificial medium of the present invention can be prepared by adding a predetermined amount of water to the water-absorbing polymer and the cationic polymer. Water is preferably added under gentle stirring.

According to the present invention, the aqueous artificial medium may further comprise a surfactant. The surfactant for use may be a nonionic surfactant, an anionic surfactant, a cationic surfactant or an amphoteric surfactant, or a mixture thereof. The surfactant is preferably used in an amount of 0.0001 to 20% by weight and more preferably 0.001 to 1% by weight.

The nonionic surfactant includes, for example, a polyoxyalkylene alkyl or alkenyl ether such as polyoxyethylene lauryl ether, polyoxyethylene oleyl ether; a polyoxyalkylene alkyl aryl ether; a condensate of polyoxyalkylene alkyl aryl ether with formaldehyde; a polyoxyalkylene aryl ether; a sorbitan fatty acid ester; a polyoxyalkylene sorbitan fatty acid ester; a polyoxyalkylene sorbitol fatty acid ester; a glycerol fatty acid ester; a polyoxyalkylene glycerol fatty acid ester; a polyoxyalkylene fatty acid ester; a polyoxyalkylene block copolymer; polyoxyalkylene block copolymer glycerol fatty acid ester; a polyoxyalkylene alkyl sulfonamide; a polyoxyalkylene rosin ester; an alkyl polyglycoside; a polyoxyalkylene alkyl polyglycoside; a polyoxyethylene alkylamine; a polyoxyethylene hardened (or hydrogenated) castor oil; an alkyl alkanol amide; and a mixture of two or more thereof. The alkyl group and the alkenyl group including those described below are preferably those having a $C_{8-24}$ linear or branched structure.

The cationic surfactant includes, for example, a monoalkyl primary amine; a monoalkyl di-lower alkylamine; a dialkyl mono-lower alkylamine; an adduct to an alkylamine with ethylene oxide such as an adduct to a tallow amine with ethylene oxide, an adduct to oleyl amine with ethylene oxide, an adduct to soy amine with ethylene oxide, an adduct to cocoamine with ethylene oxide, an adduct to synthetic alkylamine with ethylene oxide adduct, and an adduct to octyl amine with ethylene oxide; an adduct to alkylamine with propylene oxide; an alkanolamine fatty acid ester such as a triethanolamine di-fatty acid ester; an adduct to alkanolamine fatty acid ester with an alkylene oxide; an ether amine; an adduct to an ether amine with an alkylene oxide; an acid salt thereof (e.g. a salt with an inorganic acid such as hydrochloric acid, sulfuric acid, phosphoric acid or an organic acid such as acetic acid, lactic acid, citric acid) and a quaternary product thereof (e.g. a quaternary product thereof with methyl chloride, dimethyl sulfate, diethyl sulfate, benzyl chloride etc.); and a mixture of two or more thereof.

Among the anionic surfactants, typical one can be available in a form of aqueous solution or solid. Examples thereof include a fatty acid and a salt thereof such as caprylic acid, lauric acid, stearic acid, oleic acid and a salt thereof; a polycarboxylate; an alkylbenzene sulfonate; an alkylnaphthalene sulfonate; a condensate of naphthalene sulfonate with formalin; an alkyl sulfosuccinate; a hydroxy alkane sulfonate; an alkene sulfonate; an α-olefin sulfonate; an N-acyl-N-methyl taurate; a mono- or di-alkyl sulfate salt such as sodium lauryl sulfate and lauryl sulfate triethanolamine; a polyoxyalkylene mono- or di-alkyl ether sulfate; a polyoxyalkylene alkyl aryl ether sulfate; an alkyl diphenyl ether disulfonate; an alkyl phosphate; a polyoxyalkylene alkyl phosphate; a polyoxyalkylene alkyl ether phosphate; a polyoxyalkylene alkyl aryl ether phosphate; a polyoxyalkylene ether acetic acid or a salt thereof; a linear or branched alkylamide polyoxyalkylene ether acetic acid or a salt thereof; and a mixture two or more thereof (including sodium, potassium, ammonium and amine salts thereof).

Then, suitable examples of the amphoteric surfactant include lauryl dimethyl amine oxide, trade name: Armox C/12, an imidazolinium betaine (trade name: Miranol), an alkyl betaine, trade name: Lonzaine, and a mixture thereof.

Among the surfactants described above, the cationic surfactant and nonionic surfactant are preferably used and the cationic surfactant is more preferably used in the present invention.

According to the present invention, the aqueous artificial medium can further comprise a "porous water-supplying support having a communicating hole". The "porous water-supplying support having a communicating hole" has an ability to include water and an ability to gradually release water and has strength being capable of fixing and supporting a plant inserted therein. The support may be a naturally occurring or synthetic one and is particularly preferably foam of resin. The resin includes urethane resin, phenol resin, polyester resin, and urea resin. The urethane resin, phenol resin and polyester resin are preferable. The urethane resin is preferably open-cell foam having a communicating hole (e.g. open-cell foam in JP-A 49-63796, urethane foam communicating in the same direction in JP 56-143227, etc.). The urethane foam may be any one of rigid, semi-rigid and flexible one but is preferably rigid urethane foam having a communicating hole. Further, urethane rendered hydrophilic such as hydrophilic urethane foam described in JP-A 48-94797 is preferable. Further, urethane being excellent in biodegradability such as polyurethane described in JP-A 9-12588 is preferable. The phenol resin is preferably water-absorbing phenol resin foam described in JP-A 8-157634, JP-A 7-207058 etc. The polyester resin for use is preferably fibrous and includes polyester fibers having water-holding property and air-permeability for cultivation of a plant used in JP-A 53-33836, for instance. The urea resin includes a urea resin composition or the like for water-absorbing foam described in JP-A 9-176360.

The amount of the water-supplying support is used in the range of 0.01 to 50% by weight, preferably 0.05 to 20% by weight, and more preferably 0.1 to 10% by weight. In this range, both of the effects for supporting a plant and supplying water are excellent.

In the support for a plant of the present invention, both of the water-absorbing polymer and the water-supplying support hold water, thus having been confirmed that the mechanism of preventing vaporization of water, maintaining the held content of water in total, and further transferring water from the water-absorbing polymer to the water-supplying support when the plant absorbs water from the water-supplying support, and these are not predictable from the conventional finding. The ratio by volume of the water-absorbing polymer to the water-supplying support, of which each is in a state impregnated with water, shall be about 1/9 to 9/1. Because water can be supplied to the plant easier from the water-supplying support than from the water-absorbing polymer, better growth can be attained by the support for the plant of the present invention than by the conventional artificial medium comprising exclusively the water-absorbing polymer or being mainly based on the water-absorbing polymer. Further, because the plant can be sufficiently supported by the water-supplying support, the plant saves and the effect on plant is also satisfactorily demonstrated even if the plant is large.

When the polymer composition and the support are contained, the relationship therebetween includes e.g. (a) two-layer type wherein the upper part is the polymer composition and the lower part is the support, (b) uniform dispersion of the polymer composition and the support, and the like.

According to the present invention, the aqueous artificial medium can further comprise a fertilizer component. The fertilizer component can include a general fertilizer such as a nitrogen-based fertilizer, a phosphate-based fertilizer, a potassium-based fertilizer, an organic fertilizer, a compound fertilizer, a calcium fertilizer (liming material), a silicate-based fertilizer, a magnesia fertilizer, a manganese-based fertilizer, a boric acid and a borax, and a micronutrient mixture, as well as other special fertilizers. The fertilizer component is in the form of liquid or solid such as powder, and can be allowed to present in the aqueous artificial medium by adding it with the cationic polymer to the water-absorbing polymer or by incorporating it into water poured into the water-absorbing polymer.

The aqueous artificial medium of the present invention can also comprise one or more components selected from a freshness-keeping agent, a vitalizing agent, a preservative, an insecticide, a soil improver, a plant hormone, and an inhibitor of polymer decomposition. These components can also be added together with the cationic polymer to the water-absorbing polymer or incorporated in water poured into the water-absorbing polymer. Among these, the preservative includes an inorganic preservative such as an ozone-based compound including ozone, a chlorine compound such as sodium hypochlorite, an iodine compound such as iodine, a peroxide such as an aqueous solution of hydrogen peroxide, a boron-based compound such as sodium borate, a copper-based compound such as copper sulfate, a zinc-based compound such as zinc sulfate, a sulfur-based compound such as lime polysulfide, a calcium-based compound such as calcium oxide, sodium silicofluoride and a silver-based compound such as thiosulfite silver complex. The natural extract-based compound includes hinokitiol, a thick-stemmed bamboo extract, creosote oil etc. The organic and aliphatic compound includes an organotin compound, a cyclopentane derivative, a halogen derivative, a monohydric alcohol, a dihydric alcohol derivative, a saturated aldehyde, a saturated monocarboxylic acid, an unsaturated monocarboxylic acid, an unsaturated ether, a lactone, a secondary amine, an amino acid derivative, a sulfonic-acid derivative, a hydroxamic acid derivative, a cyanuric acid derivative, a cyanic acid derivative, a thiocarbamide derivative, a guanidine derivative, hydantoin, a dithiol, an arsine derivative, a phosphate etc. The organic and aromatic compound includes a carbonate, a quaternary ammonium salt, a monoamine derivative, a diamine derivative, a hydroxylamine derivative, an anilide derivative, a nitrile derivative, an imidazole derivative, a benzothiazole derivative, an isothiazole derivative, a thiadiazole derivative, a triazine derivative, a guanidine derivative, a pyridine derivative, a pyrazolopyridine derivative, a benzofuran derivative, a monocyclic hydrocarbon derivative, a halogenobenzene derivative, a sulfone derivative, a benzenesulfonic acid derivative, a mercaptocarboxylic acid derivatives, hydroxycarboxylic acid derivatives, monovalent phenol derivative, a divalent phenol derivative, a phenol ether derivative, a phenol ester derivative, a halogenophenol derivative, a phenyl derivative, biphenyl, a monovalent naphthol, a naphthalene derivative, a pyrrole derivative, a quinone derivative, a quinoline derivative, an isoquinoline derivative, an organophosphate derivative etc. The preservative may be any preservative being not toxic to a plant. Specifically, there can be mentioned sodium hypochlorite, sodium borate, a thiosulfite silver complexe, a quaternary ammonium salt such as benzalconium chloride, a benzthiazole derivative such as 1,2-benzisothiazoline-3-one, and a quinoline derivative such as a hydroxyquinoline salt. The inhibitor of polymer decomposition includes a radical capturing agent based on phenol, an aromatic amine and a hindered amine, an antioxidant such as a thioether-based antioxidant, a phosphorus-based antioxidant and a phenolic antioxidant, an UV absorber based on benztriazole, benzophenone, salicylate and cyanoacrylate, and an extinction agent based on a nickel complex, and a light-shielding agent such as titanium oxide, alumina etc.

The aqueous artificial medium of the present invention can be an artificial medium in the form of a mixture with one or more groups selected from soil, sand, inorganic matter, support etc. In this case too, the aqueous artificial medium of the present invention has better influence on plants than the conventional water-absorbing polymer and is thus more preferable for plants than the conventional water-absorbing polymer-containing medium. Although the blended ratio of the aqueous artificial medium of the present invention to the soil or the like is not particularly limited, the ratio of the soil to the aqueous artificial medium can be used in a volume ratio of e.g. about 0.1 to 1.0 for cultivation of potted plants.

The soil includes red soil, smolnitz, peat moss, compost, humus, lime, Kanuma soil, mountain moss, Hyuga soil, bog moss, keto soil, etc. The sand and inorganic matter include river sand, mountain sand, Yahagi sand, Kiryu sand, Fuji sand and Chomei sand, and porous minerals such as rubble, vermiculite, pearlite, zeolite, osmund, slag, pumice, magnesia lime, dream ball, smoke ash, and volcanic ash but they are not limited thereto. The support is a base material which can serve as a carrier for the fertilizers, the freshness-keeping agents and other additives, and includes e.g. sawdust, pulp, paper, humus soil, chip, dust, bark, straws from rice or wheat plants, vermiculite, rock wool, gypsum, porous ceramics, etc.

Industrial Applicability

According to the present invention as described above, there is provided an aqueous artificial medium being useful for growth of plants. This aqueous artificial medium is useful for growth of plants, for germination, rooting and growth of seeds, and for keeping the freshness of cut flowers and prolonging the life thereof, and it can be applied to all plants being capable of cultivation in soil or hydroponic cultivation.

EXAMPLES (1) Preparation of an Aqueous Artificial Medium

The water-absorbing polymer selected from a to g below was added to a vessel for hydroponic cultivation in such an amount that the degree of water absorption (as the ratio by weight) is shown in each of a to g when tap water is added.

a. Crosslinked Na polyacrylate (provided by Kao Corp.): 150-fold (0.67%)
b. Isobutylene/maleate (provided by Kuraray Co., Ltd., trade name of KI gel): 120-fold (0.83%)
c. Starch/polyacrylate (provided by Sanyo Chemical Industries, Ltd., trade name of Sun Fresh ST100): 250-fold (0.40%)
d. Vinyl acetate/maleate (provided by The Nippon Synthetic Chemical Industry, Co., Ltd., trade name of Aquareserve): 50-fold (2.00%):
e. Poly-N-vinyl acetamide (provided by Showa Denko, K.K.): 30-fold (3.30%)
f. A mixture of crosslinked Na polyacrylate (provided by Kao Corp.): 300-fold (0.33%) and vinyl acetate/maleate (provided by The Nippon Synthetic Chemical Industry, Co., Ltd., trade name of Aquareserve): 100-fold (1.00%)
g. A mixture of crosslinked Na polyacrylate (provided by Kao Corp.): 300-fold (0.33%) and poly-N-vinyl acetamide (provided by Showa Denko, K.K.): 30-fold (3.30%).

Then, the cationic polymer, that is, 1. cationic cellulose (provided by Amerchol Corporation, trade name of Polymer JR-400), 2. quaternary styrene (provided by Japan Organo Co., Ltd., trade name of Amberlite XT5007), or 3. a mixture of cationic cellulose (provided by Amerchol Corporation, trade name of Polymer JR-400) and quaternary styrene (provided by Japan Organo Co., Ltd., trade name of Amberlite XT5007) in a ratio of 1:1 by weight was added thereto at a final concentration of 5000 ppm (or 2500 ppm each of the respective polymers in the mixture 3).

Further, a commercial liquid fertilizer (N:P:K=5:10:5) was added thereto as a fertilizer component at the degree of dilution of 1000-fold (0.1%) in a flower growth test and in a rooting test. Further, Proxel BDN as a preservative and a benzophenone-based UV absorber (SEESORB 100, Shipro Kasei Co., Ltd.) as an inhibitor of polymer decomposition were added thereto at final concentrations of 200 ppm and 1000 ppm respectively in all tests. Thereafter, the mixture was diluted with a predetermined amount of tap water under gentle stirring, then stirred for a few minutes, and left for 2 hours to give 18 aqueous artificial media in a gel form. These are shown in Examples 1 to 18 in Table 1.

Separately, 6 aqueous artificial media in a gel form were prepared without adding the cationic polymer to the water-absorbing polymers a to f. These are also shown in Comparative Examples 1 to 6 in Table 1.

TABLE 1

| | | Water-absorbing polymer | | Cationic polymer | |
|---|---|---|---|---|---|
| | | Type | Amount (by weight) | Type | Amount (by weight) |
| Example | 1 | Crosslinked Na polyacrylate | 0.67 | Cationic cellulose | 0.5 |
| | 2 | Crosslinked Na polyacrylate | 0.67 | Quaternary styrene | 0.5 |
| | 3 | Crosslinked Na polyacrylate | 0.67 | Cationic cellulose/quaternary styrene | 0.25/0.25 |
| | 4 | Isobutylene/maleate | 0.83 | Cationic cellulose | 0.5 |
| | 5 | Isobutylene/maleate | 0.83 | Quaternary styrene | 0.5 |
| | 6 | Isobutylene/maleate | 0.83 | Cationic cellulose/quaternary styrene | 0.25/0.25 |
| | 7 | Starch/polyacrylate | 0.4 | Cationic cellulose | 0.5 |
| | 8 | Starch/polyacrylate | 0.4 | Quaternary styrene | 0.5 |
| | 9 | Starch/polyacrylate | 0.4 | Cationic cellulose/quaternary styrene | 0.25/0.25 |
| | 10 | Vinyl acetate/maleate | 2 | Cationic cellulose | 0.5 |
| | 11 | Vinyl acetate/maleate | 2 | Quaternary styrene | 0.5 |
| | 12 | Vinyl acetate/maleate | 2 | Cationic cellulose/quaternary styrene | 0.25/0.25 |
| | 13 | Poly-N-vinyl acetamide | 3.3 | Cationic cellulose | 0.5 |
| | 14 | Poly-N-vinyl acetamide | 3.3 | Quaternary styrene | 0.5 |
| | 15 | Poly-N-vinyl acetamide | 3.3 | Cationic cellulose/quaternary styrene | 0.25/0.25 |
| | 16 | Vinyl acetate/maleate Crosslinked Na polyacrylate | 1 0.33 | Cationic cellulose | 0.5 |

TABLE 1-continued

| | | Water-absorbing polymer | | Cationic polymer | |
|---|---|---|---|---|---|
| | | Type | Amount (by weight) | Type | Amount (by weight) |
| | 17 | Vinyl acetate/maleate<br>Crosslinked Na polyacrylate | 1<br>0.33 | Quaternary styrene | 0.5 |
| | 18 | Vinyl acetate/maleate | 1 | Cationic cellulose/quaternary styrene | 0.25/0.25 |
| Comparative<br>Example | 1 | Crosslinked Na polyacrylate | 0.67 | — | — |
| | 2 | Isobutylene/maleate | 0.83 | — | — |
| | 3 | Starch/polyacrylate | 0.4 | — | — |
| | 4 | Vinyl acetate/maleate | 2 | — | — |
| | 5 | Poly-N-vinyl acetamide | 3.3 | — | — |
| | 6 | Poly-N-vinyl acetamide<br>Vinyl acetate/maleate | 0.33<br>1 | — | — |

(2) A Flower Growth-keeping Test

The aqueous artificial media obtained in Examples 1 to 18 and Comparative Examples 1 to 6 were examined respectively in a growth-keeping test on a rooted plant (: a commercial potted plant of polyantha). The soil was washed out carefully with running water such that the roots were not impaired, and then the plant was implanted in a 300 ml vessel for hydroponic cultivation containing each of aqueous artificial media. Thereafter, the plant was cultivated under the conditions of a temperature of 20° C., a humidity of 60% and an irradiation of 10,000 lux. The plant was sealed therearound so that water was prevented from being evaporated except from the plant, and then the total weight of the plant and the culture vessel was measured with time to determine the amount of water transpired by the plant. The amount of water transpired was measured every day, and tap water was supplied whenever necessary to compensate for the transpired water so that the concentration of the solutes in the vessel was kept constant. The maintenance of growth was evaluated both visually and in terms of the amount of water transpired. The results of the visual evaluation on the 10th day of cultivation and the total amount of water transpired for 10 days of cultivation are shown in Table 2. The vigorousness of flowers, the amount of water transpired or the growth-keeping effect was observed to be respectively better, more or higher in all of Examples where the aqueous artificial medium comprising the cationic polymer added to the water-absorbing polymer was used than in Comparative Examples 1 to 6 where the water-absorbing polymer was used singly.

TABLE 2

| | Evaluation | |
|---|---|---|
| | Visual examination | Total amount (g/plant) of water transpired for 10 days |
| Example | | |
| 1 | 90 | 350 |
| 2 | 95 | 370 |
| 3 | 90 | 360 |
| 4 | 80 | 320 |
| 5 | 85 | 355 |
| 6 | 85 | 335 |
| 7 | 80 | 335 |
| 8 | 95 | 370 |
| 9 | 85 | 355 |
| 10 | 90 | 350 |
| 11 | 95 | 370 |
| 12 | 95 | 355 |
| 13 | 90 | 350 |

TABLE 2-continued

| | Evaluation | |
|---|---|---|
| | Visual examination | Total amount (g/plant) of water transpired for 10 days |
| 14 | 100 | 380 |
| 15 | 95 | 360 |
| 16 | 90 | 360 |
| 17 | 95 | 370 |
| 18 | 90 | 360 |
| Comparative Example | | |
| 1 | 40 | 210 |
| 2 | 30 | 165 |
| 3 | 30 | 150 |
| 4 | 50 | 235 |
| 5 | 40 | 200 |
| 6 | 45 | 245 |

Vigorousness of flowers:
100 good growth
50 withering of half flowers
0 complete withering (3) Rooting and Growth Test After Germination of Seeds 20 seeds of morning glory (Takii & Company LTD) were sown in each of 300-ml vessels for hydroponic cultivation containing the aqueous artificial media obtained in Examples 1 to 18 and Comparative Examples 1 to 6. Thereafter, they were cultivated under the conditions of a temperature of 20° C., a humidity of 60% and shading (after germination, an irradiation of 10,000 lux). The weight of each of vessels was measured every day, and tap water was supplied whenever necessary to compensate for the transpired and evaporated water. The degree of germination, rooting on the 20th day of cultivation, and upper-part growth were evaluated visually. The results are shown in Table 3. The degree of germination was improved and rooting and growth were good in all of Examples where the aqueous artificial medium comprising the cationic polymer added to the water-absorbing polymer was used, as compared with Comparative Examples 1 to 6 where the water-absorbing polymer was used singly as the medium.

TABLE 3

| | Degree of germination (%) | Rooting | Upper-part growth |
|---|---|---|---|
| Examples | | | |
| 1 | 90 | + | + |
| 2 | 95 | + | + |
| 3 | 90 | + | + |
| 4 | 85 | + | + |
| 5 | 95 | + | + |
| 6 | 80 | + | + |
| 7 | 80 | + | + |
| 8 | 90 | + | + |
| 9 | 90 | + | + |
| 10 | 80 | + | + |
| 11 | 90 | + | + |
| 12 | 80 | + | + |
| 13 | 90 | + | + |
| 14 | 100 | + | + |
| 15 | 95 | + | + |
| 16 | 90 | + | + |
| 17 | 90 | + | + |
| 18 | 80 | + | + |
| Comparative Examples | | | |
| 1 | 60 | − | − |
| 2 | 40 | − | − |
| 3 | 50 | ± | ± |
| 4 | 60 | − | − |
| 5 | 70 | ± | ± |
| 6 | 60 | − | − |

Evaluation:
+ good growth
± slight inhibition of growth
− inhibition of growth and no or less growth (4) A Freshness-keeping and Life-prolonging Test on Cut Flowers A commercial spray rose (little mabel) just after flowering was used as cut flowers. The aqueous artificial media obtained in Examples 1 to 18 and Comparative Examples 1 to 6 were introduced into 300-ml vessels for hydroponic cultivation respectively, and the flowers of 15 cm in length, which had been cut sharply so as not to close their tracheas, were inserted directly into each of media. Thereafter, they were cultivated under the conditions of a temperature of 20° C., a humidity of 60% and an irradiation of 10,000 lux. The freshness-keeping and life-prolonging effects were evaluated by visually examining the vigorousness of the flowers. The results on the 5th day of cultivation are shown in Table 4. The vigorousness of the flowers was good in all of Examples using the aqueous artificial medium comprising the cationic polymer added to the water-absorbing polymer, as compared with Comparative Examples 1 to 6 where the water-absorbing polymer was used as the medium for cultivation.

TABLE 4

| | Evaluation of visually examining the vigorousness of the flowers |
|---|---|
| Example | |
| 1 | 90 |
| 2 | 100 |
| 3 | 95 |
| 4 | 70 |
| 5 | 90 |
| 6 | 85 |
| 7 | 85 |
| 8 | 95 |
| 9 | 90 |
| 10 | 85 |
| 11 | 90 |
| 12 | 90 |
| 13 | 70 |
| 14 | 85 |
| 15 | 75 |
| 16 | 90 |
| 17 | 95 |
| 18 | 90 |
| Comparative Example | |
| 1 | 40 |
| 2 | 20 |
| 3 | 25 |
| 4 | 25 |
| 5 | 25 |
| 6 | 35 |

Vigorousness of flowers:
100 good growth
50 withering of half flowers
0 complete withering (5) Preparation of an Artificial Medium Comprising a Support
(5-1) Preparation of an Artificial Medium for Cut Flowers
Preparation of Rigid Urethane Foam 10 g of water and about 400 ml of commercial instantaneously foaming urethane foam (provided by ABC Shokai Co., Ltd., trade name of Dash One (one-packed type)) were injected into a 500-ml vessel, then stirred with a hand-mixer and calmly left for 30 minutes to give rigid urethane foam.

3 g of the water-supplying support described below (at a final concentration of 1%) was introduced into a 300-ml vessel for hydroponic cultivation until the support reached about half of the height of the vessel for hydroponic cultivation, molded and occupied therein.
a. Phenol resin (provided by Matsumura Kougei Co., Ltd.)
b. The rigid urethane foam (prepared above)

Then, the water-absorbing polymer described below was added in such an amount that the degree of water absorption (as ratio by weight) respectively was attained upon addition of water.
a. Crosslinked Na polyacrylate (Kao Corp.): 150-fold (0.67%)
b. Poly-N-vinyl acetamide (Showa Denko, K.K.): 30-fold (0.33%)
c. Vinyl acetate/maleate (Nippon Synthetic Chemical Industry, Co., Ltd.): 100-fold (1.00%)

Then, the cationic polymer described below was added in such concentration that it became 0.5% (as concentration by weight) upon addition of tap water.
a. Cationic cellulose (Amerchol Corporation)
b. Quaternary styrene (Japan Organo Co., Ltd.)

Proxel BDN was added at a final concentration of 200 ppm as a preservative to all of the artificial aqueous media for cut flowers. Thereafter, each of media was diluted with being adjusted to 300 ml by tap water under gentle stirring, then stirred for a few minutes, and left for about 2 hours to obtain 12 artificial media for cut flowers, which comprises the water-absorbing polymer layer in the upper layer and the water-supplying support layer in the lower layer The cationic polymer was not added to the system in the Comparative Examples. The test conditions described above are shown in Table 5.

present invention comprising the water-absorbing polymer, the water-supplying support and the cationic polymer, as compared with Comparative Examples 7 to 12 where the water-absorbing polymer and the water-supplying support were used as the medium for cultivation.

TABLE 5

|  |  | Water-absorbing polymer | | Water-supplying support | | Cationic polymer | |
|---|---|---|---|---|---|---|---|
|  |  | Type | Amount | Type | Amount | Type | Amount |
| Example | 19 | Crosslinked Na polyacrylate | 0.67% | Phenol resin | 1% | Cationic cellulose | 0.50% |
|  | 20 | Poly-N-vinyl acetamide | 3.30% | Phenol resin | 1% | Cationic cellulose | 0.50% |
|  | 21 | Vinyl acetate/maleate | 1.00% | Phenol resin | 1% | Cationic cellulose | 0.50% |
|  | 22 | Crosslinked Na polyacrylate | 0.67% | Rigid urethane foam | 1% | Cationic cellulose | 0.50% |
|  | 23 | Poly-N-vinyl acetamide | 3.30% | Rigid urethane foam | 1% | Cationic cellulose | 0.50% |
|  | 24 | Vinyl acetate/maleate | 1.00% | Rigid urethane foam | 1% | Cationic cellulose | 0.50% |
|  | 25 | Crosslinked Na polyacrylate | 0.67% | Phenol resin | 1% | Quaternary styrene | 0.50% |
|  | 26 | Poly-N-vinyl acetamide | 3.30% | Phenol resin | 1% | Quaternary styrene | 0.50% |
|  | 27 | Vinyl acetate/maleate | 1.00% | Phenol resin | 1% | Quaternary styrene | 0.50% |
|  | 28 | Crosslinked Na polyacrylate | 0.67% | Rigid urethane foam | 1% | Quaternary styrene | 0.50% |
|  | 29 | Poly-N-vinyl acetamide | 3.30% | Rigid urethane foam | 1% | Quaternary styrene | 0.50% |
|  | 30 | Vinyl acetate/maleate | 1.00% | Rigid urethane foam | 1% | Quaternary styrene | 0.50% |
| Comparative Example | 7 | Crosslinked Na polyacrylate | 0.67% | Phenol resin | 1% |  |  |
|  | 8 | Poly-N-vinyl acetamide | 3.30% | Phenol resin | 1% |  |  |
|  | 9 | Vinyl acetate/maleate | 1.00% | Phenol resin | 1% |  |  |
|  | 10 | Crosslinked Na polyacrylate | 0.67% | Rigid urethane foam | 1% |  |  |
|  | 11 | Poly-N-vinyl acetamide | 3.30% | Rigid urethane foam | 1% |  |  |
|  | 12 | Vinyl acetate/maleate | 1.00% | Rigid urethane foam | 1% |  |  |

(5-2) Preparation of an Artificial Medium for Potted Plants

In a commercial potted plant of plyantha primrosa, the sail was washed out with running water carefully such that its roots was not impaired. The water-supplying support shown in Table 5 was ground at suitable degrees and 3 g of each thereof (at a final concentration of 1%) was introduced into a 300-ml vessel for hydroponic cultivation until it reached to about half of the height of the vessel. The plant was implanted therein by covering its roots with the water-supplying support. Then, the water-absorbing polymer shown in Table 5 was respectively added at the shown degree of water absorption and placed on the water-supplying support. Further, the cationic polymer shown in Table 5 was added at the predetermined concentration. Further, a commercial fertilizer (N:P:K=5:10:5) was added as a fertilizer component at the degree of dilution of 1000-fold (0.1%). Thereafter, the resultant mixture was diluted with a predetermined amount of tap water under gentle stirring, then stirred for a few minutes, and left calmly for about 2 hours to obtain 12 artificial media for potted plants, which comprises the water-absorbing polymer layer in the upper layer and the water-supplying support layer in the lower layer.

The cationic polymer was not added to the system in the Comparative Examples.

(6) A Freshness-keeping and Life-prolonging Test on Cut Flowers

A commercial spray rose (little mabel) just after flowering was used as cut flowers. The flowers of 20 cm in length, which had been cut sharply so as not to close their tracheas, were inserted into each of the water-supplying support parts in the aqueous artificial media prepared in (5-1). Thereafter, they were cultivated under the conditions of a temperature of 20° C., a humidity of 60% and an irradiation of 10,000 lux. The freshness-keeping and life-prolonging effects were evaluated by visually examining the vigorousness of the flowers. The results on the 8th day of cultivation are shown in Table 6. The vigorousness of the flowers was good in all of Examples using the aqueous artificial medium of the (7) A Growth-keeping Test on Flowers (of Rooted Plants)

The artificial media for potted plants, prepared in (5-2), were examined in a growth-keeping test on rooted plants. After the aqueous artificial media for potted plants were prepared as described above, plants were cultivated under the conditions of a temperature of 20° C., a humidity of 60% and an irradiation of 10,000 lux. The plant was sealed therearound so that water was prevented from being evaporated except from the plant, and then the total weight of the plant and the culture vessel was measured with time to determine the amount of water evaporated by the plant. The amount of water evaporated was measured every day, and tap water was supplied whenever necessary to compensate for the evaporated water so that the concentration of the solutes in the vessel was kept constant.

The maintenance of growth was evaluated, and point 100 was given to well vigorous growth of the flowers. The results of the visual evaluation on the 30th day of cultivation are shown in Table 7. It was observed that the vigorousness of the flowers was good and the growth-keeping effect was high in all of Examples in the system to which the cationic polymer had been added, as compared with Comparative Examples 7 to 12 in the system comprising the water-absorbing polymer and the water-supplying support.

TABLE 6

|  | Evaluation of visually examining the vigorousness of the flowers (on the 8th day) |
|---|---|
| Example |  |
| 19 | 90 |
| 20 | 85 |
| 21 | 90 |
| 22 | 90 |
| 23 | 80 |

TABLE 6-continued

|  | Evaluation of visually examining the vigorousness of the flowers (on the 8th day) |
| --- | --- |
| 24 | 85 |
| 25 | 100 |
| 26 | 90 |
| 27 | 90 |
| 28 | 90 |
| 29 | 85 |
| 30 | 90 |
| Comparative Example | |
| 7 | 40 |
| 8 | 50 |
| 9 | 50 |
| 10 | 30 |
| 11 | 40 |
| 12 | 40 |

Vigorousness of flowers:
100 good growth
50 withering of half flowers
0 complete withering

TABLE 7

|  | Evaluation of visually examining the vigorousness of the flowers (on the 30th day) |
| --- | --- |
| Example | |
| 19 | 90 |
| 20 | 80 |
| 21 | 80 |
| 22 | 90 |
| 23 | 85 |
| 24 | 80 |
| 25 | 95 |
| 26 | 85 |
| 27 | 85 |
| 28 | 95 |
| 29 | 80 |
| 30 | 75 |
| Comparative Example | |
| 7 | 20 |
| 8 | 40 |
| 9 | 30 |
| 10 | 20 |
| 11 | 40 |
| 12 | 40 |

Vigorousness of flowers:
100 good growth
50 withering of half flowers
0 complete withering In the present invention shown above, Examples 1 to 3 are preferable when the polymer composition is used in the aqueous artificial medium and Examples 19, 22, 25 and 28 are preferable when the polymer composition is used together with the support for plants. The present invention can be applied to both rooted plants and cut plants.

What is claimed is:

1. An aqueous artificial medium comprising 0.01 to 10% by weight of a water-absorbing polymer and 0.001 to 10% by weight of a cationic polymer which is insoluble in water or an aqueous salt solution.

2. The aqueous artificial medium as claimed in claim 1, wherein the water-absorbing polymer is selected from an anionic polymer, a nonionic polymer and a mixture thereof.

3. The aqueous artificial medium as claimed in claim 1 or 2, which further comprises a porous water-supplying support having a communicating hole.

4. The aqueous artificial medium as claimed in claim 1, wherein the ratio by weight of the water-absorbing polymer: the cationic polymer is from 1:0.01 to 1:10.

5. The aqueous artificial medium as claimed in claim 1, which further comprises a fertilizer.

6. A method of growing a plant in an aqueous artificial medium comprising 0.01 to 10% by weight of a water-absorbing polymer and 0.001 to 10% by weight of a cationic polymer which is insoluble in water or an aqueous salt solution.

7. A process of preparing an aqueous artificial medium comprising a polymer composition comprising a water-absorbing polymer and a cationic polymer for an aqueous artificial medium, wherein said process comprises combining the water-absorbing polymer and the cationic polymer which is insoluble in water or an aqueous salt solution.

8. The process as claimed in claim 7, further comprising a step of adding the polymer composition to a porous water-supplying support having a communicating hole.

9. A polymer composition for an aqueous artificial medium comprising a water-absorbing polymer and a cationic polymer at a ratio of from 1:0.01 to 1:10 by weight, wherein the cationic polymer is insoluble in water or an aqueous salt solution.

10. An aqueous artificial medium material comprising a polymer composition for an aqueous artificial medium comprising a water-absorbing polymer and a cationic polymer at a ratio of from 1:0.01 to 1:10 by weight and a porous water-supplying support having a communicating hole, wherein the cationic polymer is insoluble in water or an aqueous salt solution.

11. The aqueous artificial medium as claimed in claim 1, wherein the water-absorbing polymer is insoluble in water or an aqueous salt solution.

12. The method of growing a plant in an aqueous artificial medium as claimed in claim 6, wherein the water-absorbing polymer is insoluble in water or an aqueous salt solution.

13. The process as claimed in claim 7, wherein the water-absorbing polymer is insoluble in water or an aqueous salt solution.

14. The polymer composition as claimed in claim 9, wherein the water-absorbing polymer is insoluble in water or an aqueous salt solution.

15. The aqueous artificial medium material as claimed in claim 10, wherein the water-absorbing polymer is insoluble in water or an aqueous salt solution.

16. The aqueous artificial medium as claimed in claim 1, further comprising at least one component selected from the group consisting of a surfactant, a freshness-keeping agent, a vitalizing agent, a preservative, an insecticide, a soil improver, a plant hormone, and an inhibitor of polymer decomposition.

17. The aqueous artificial medium as claimed in claim 1, wherein the aqueous artificial medium is in the form of a mixture with at least one component selected from the group consisting of soil, sand, inorganic matter, and a support.

18. The aqueous artificial medium as claimed in claim 3, wherein the support is selected from the group consisting of sawdust, pulp, paper, humus soil, chip, dust, bark, straws from rice or wheat plants, vermiculite, rock wool, gypsum, and porous ceramics.

19. The aqueous artificial medium as claimed in claim 3, further comprising at least one component selected from the group consisting of a surfactant, a freshness-keeping agent, a vitalizing agent, a preservative, an insecticide, a soil improver, a plant hormone, and an inhibitor of polymer decomposition.

* * * * *